United States Patent Office 3,122,789
Patented Mar. 3, 1964

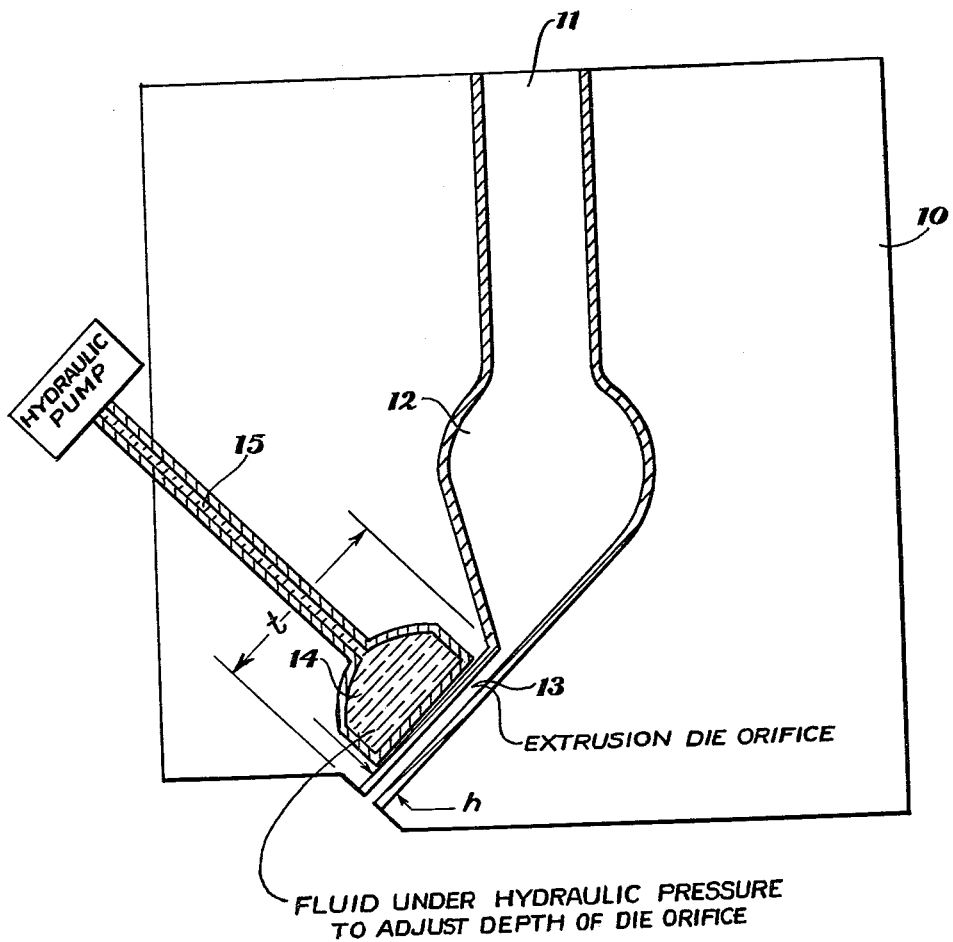

3,122,789
EXTRUSION DIE INCORPORATING A HYDRAULICALLY DEFORMABLE ORIFICE
Robert D. Coffee, Rochester, N.Y., assignor to Eastman Kodak Company, Rochester, N.Y., a corporation of New Jersey
Filed Mar. 7, 1962, Ser. No. 178,120
3 Claims. (Cl. 18—12)

This invention relates to extrusion dies particularly suitable for forming thermoplastic compositions into continuous flat sheets and film. More particularly, this invention relates to a die structure for extruding a flat sheet which structure includes means for hydraulically adjusting the depth of the slot orifice to provide improved thickness control in the thermoplastic sheet or film being extruded.

An object of the present invention is to provide an extrusion die structure for the production of flat sheets or films which has improved control of the depth of the die orifice whereby a uniform thick sheet or film can be produced.

Other objects will appear hereinafter.

In accordance with the present invention, these and other objects are attained by a die assembly structure in which a slot-like orifice is provided in the assembly structure and one side of the orifice is paralleled by a cavity in close proximity thereto. This cavity is filled with a fluid under adjustable hydraulic pressure which acts on the adjacent side of the orifice to change the depth of the die orifice. Thus, by the increase or decrease of the hydraulic pressure, the thickness uniformity of the sheet being extruded can be adjusted. Consequently, holding the hydraulic pressure constant at a desired pressure permits production of a sheet or film of desired thickness uniformity.

The present invention is further described in the following detailed description with reference to the accompanying drawing in which:

The figure is a view in section of a die assembly in accordance with the present invention. The body of the die can be made of stainless steel or other suitable metal in accordance with known practices.

Heretofore, in the production of flat sheets or films by extrusion through a slit die many different die designs and configurations have been employed. Generally some mechanical means have been provided for adjusting the slit opening to obtain greater thickness uniformity. However, experience and recently developed die design equations [D. J. Weeks, British Plastics, pp. 156–160, 201–205, (1958); J. F. Carley, J. Applied Physics, 25, 1118–1123 (1954)], clearly demonstrate the sensitivity of the film thickness to such mechanical adjustments. Thus, when an extremely uniform thickness is desired of a value calling for less than 5% variation and particularly for values less than 1 to 2%, it has proven to be very difficult for an operator to adjust the slit opening to the close tolerance (0.0002 inch and smaller) required, especially with the mechanical adjustments normally employed.

When the rheological properties of the material to be extruded are known for the conditions of flow to be encountered in the extrusion die, it is possible to design a die with the aid of the aforementioned equations to yield any desired degree of thickness uniformity. Practical machining tolerances and fabrication techniques, however, will generally limit the degree of uniformity obtainable. The application of this invention will then enable greater thickness uniformity to be attained than would be possible otherwise.

In all cases, excluding the effects of temperature gradients, viscosity differences, and distortions due to pressure and/or temperature, the theoretical design equations show that the issuing sheet will be thicker near the feed section of the die than at the die extremities and that the thickness will change across the width of the sheet in a known and continuous manner; i.e., in the form of a smooth hyperbolic secant curve. In addition there will be a thickness gradient due to the internal die pressure, developed by the flow of the plastic material, which will distort the die opening in a known manner calculable from the physical shape and material strength of the die body. This distortion of the die body due to resin pressure usually will effect the thickness uniformity only if the ends of the die slit are restrained from moving. If the uniformity is affected, it will be in a manner similar to that due to the basic die design of a center-fed die and will be additive in effect. Both effects may be counterbalanced by causing the slit opening to be changed in a direction opposite to that produced by the pressure of the resin stream through the application of the principle of this invention to essentially produce a flat sheet of uniform thickness.

As a general example, consider the case of a simple center-fed die (the figure) having a center feed supply channel 11 opening onto a cylindrical distribution cavity 12 and a narrow rectangular slit orifice 13. The resin to be extruded enters at 11, is distributed throughout the central cavity 12, and emerges as a flat sheet from the slit orifice 13 to be handled in any of numerous ways familiar to those skilled in the art.

The general equation for the thickness uniformity of the material issuing from such a die is given by Equation No. 1.

Equation No. 1

$$UI = \left(\frac{P_f}{P_i}\right)^n = (1-\epsilon)^n$$
$$= \left[1 - \frac{[(1+0.05n)L]^{(n+1)/n}}{(1+0.05n)(n+1)} \left[\frac{(n+3)h^{n+2}}{2\pi n(n+2)t^n R^{n+3}}\right]^{1/n}\right]^n$$

where $UI$ = uniformity index; ratio of the thickness of the material at the extremity of the die to that at the feed section of the die.
$\epsilon$ = the fractional loss in pressure from the feed port to the die extremity.
$n$ = the exponent in the power law expressing the deviation from Newtonian flow.
$L$ = the length of slit in a slit die from the far end of the slit to the feed end.
$h$ = the depth of the slit in a slit die. If the sheet were undeformed after leaving the die, $h$ would be the sheet thickness.
$R$ = the radius of the distribution channel.
$t$ = the width of the die slit; i.e., the dimension in the direction of flow through the slit.
$P_i$ = the pressure of the melt at the feed port.
$P_f$ = the pressure of the melt at the far end of the distribution channel.

In the simplest case where the flow of the melt is Newtonian, $n=1$ and Equation No. 1 reduces to:

Equation No. 2

$$UI = 1 - \epsilon = \frac{P_f}{P_i} = 1 - \frac{(1.05)L^2h^3}{3\pi t R^4} = \frac{Q_f}{Q_i}$$

where $Q_f$ = discharge rate at the extremity of the die.
$Q_i$ = discharge rate opposite the feed zone of the die.

Analysis of Equation No. 2 and its derivation shows that the extruded film will be thicker opposite the feed zone of the die than at the extremities of the die by an amount ϵ. In addition, the flow of the melt through the die develops a pressure drop ΔP where:

Equation No. 3

$$\Delta P = 12 t \eta Q / L h^3$$

where

ΔP=pressure drop across the die (essentially $P_1$).
Q=nominal flow rate of the melt.
η=absolute viscosity of the melt.

The internal pressure drop, ΔP, causes the material of the die to deform and change the value of $h$ locally. Such nonuniform changes in $h$ affect the thickness uniformity of the sheet and are normally corrected for by mechanically adjusting the depth of the orifice.

However, by building into the die a hollow cavity 14 adjacent to and parallel to the die slit and by hydraulically loading, through conduit 15, this cavity to some pressure greater than ΔP, the die can be made to deform in a manner opposite to that produced by ΔP and to an amount based upon the design of the cavity so that mechanical adjustments become unnecessary. By further loading the cavity to pressures greater than ΔP, the die can be made to deform so as to compensate for the non-uniform thickness caused by the basic die dimensions. Thus, with the application of the principle of this invention, an extruded sheet can be produced which is uniform in thickness to an extent not possible before by mechanical adjustments.

*Example 1*

A more specific example of this invention is the following: A center-fed die having the general configuration of the figure was used. The basic die dimensions were: $h$=0.080 inch, $L$=6.875/2 inches, $t$=1.500 inches and $R$=0.75 inch. A pressurizable cavity was located adjacent to and parallel to the die orifice or slit. This cavity was so shaped that pressure loading would produce the greatest deflection at the center of the die slit. Molten polyethylene terephthalate was extruded by suitable means at a rate of 62 pounds per hour at a temperature of 540° F. At these conditions the flow of polyethylene terephthalate through the die is essentially Newtonian.

Thus:

$$\epsilon = \frac{h^3 (1.05)(L)^2 (100)}{3 \pi t R^4}$$

$$= \frac{(0.080)^3 (1.05)(6.875/2)^2 (100)}{3 \pi (1.500)(0.75)^4} = 0.14\%$$

where: ϵ represents the thickness deviation from 100% uniformity.

This says that theoretically the extruded sheet should have been 0.14% thicker in the center than near the edges providing that there were no temperature or viscosity gradients across the die or the entering resin stream and providing that the given die dimensions were extremely uniform across the die. A 1% local variation in the value of $h$, for example, will produce a local thickness variation of three times this amount or 3%. To the theoretical thickness variation must be added the variation produced by the deformation of the die caused by the pressure drop of the resin flow through the die. The measured pressure drop was 280 p.s.i. which should have produced a calculated deflection or deformation of $h$ at the center of the die of 0.00008 inch. This amount of deformation should produce an additional error ϵ equal to 0.3%. Thus, theoretically, the thickness of the extruded film should have been uniform to within about 0.45%. However, the 0.040-inch thick film produced at these conditions had a thickness uniformity of about 5.7% with the center of the film being thicker than near the edges but varying uniformly in a smooth curve from center to edge. Approximately 45% of the sheet had a thickness variation of less than 1.25%. When the pressure cavity was pressurized to a value of 1200 p.s.i. with Dowtherm A through the use of an air-operated Sprague pump, the overall thickness uniformity was improved so that the maximum variation was reduced from 5.7% to 4.7% and now over 65% of the sheet (instead of 45%) had a thickness variation of less than 1.25%.

The large discrepancy between the actual and the theoretical values of thickness uniformity is attributed to a viscosity gradient across the entering resin stream and to a non-uniform change in the value of $h$ caused by thermal expansion differences. Nevertheless, results indicate the practicality and the improvement obtainable by the application of the principle of the invention. Other shapes for the pressurizable cavity than the one employed in the above example could produce even greater corrections. When it is noted that the indicated improvement was produced by a probable change in the value of $h$ of only 0.0003" at the center of the die with this value diminishing to zero at the extremities of the die and that a full correction could be obtained with a maximum change in $h$ of only slightly more than 0.001 inch, it becomes even more apparent that corrections by the mechanical methods normally employed by those familiar with the art are not capable of producing the small dimensional changes required for thickness variations less than about 5%.

The invention has been described in detail with particular reference to preferred embodiments thereof, but it will be understood that variations and modifications can be effected within the spirit and scope of the invention as described hereinabove and as defined in the appended claims.

I claim:

1. An extrusion die comprising an orifice defined by four walls at least one of which walls is deformable in a direction normal to its surface, a cavity defined by containment means disposed adjacent and connected with said deformable wall opposite said orifice, fluid filling said cavity and means for exerting pressure on said fluid whereby the pressure of said fluid can be increased so as to deform said deformable wall and accurately affect minute changes in the size of said orifice.

2. An extrusion die as recited in claim 1 wherein said deformable wall comprises a portion of said containment means defining said cavity.

3. An extrusion die as claimed in claim 1 wherein said orifice is rectangular.

References Cited in the file of this patent

UNITED STATES PATENTS

| | | |
|---|---|---|
| 669,279 | Harrington | Mar. 5, 1901 |
| 2,084,113 | Sherts | June 15, 1937 |
| 2,168,889 | Thomas | Aug. 8, 1939 |
| 2,528,643 | Dubbs | Nov. 7, 1950 |